United States Patent
Lee et al.

(10) Patent No.: US 8,283,893 B2
(45) Date of Patent: Oct. 9, 2012

(54) PROTECTION CIRCUIT FOR BATTERY PACK AND BATTERY PACK INCLUDING THE SAME

(75) Inventors: Woojin Lee, Suwon-si (KR); Jonghwa Hur, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 330 days.

(21) Appl. No.: 12/701,350

(22) Filed: Feb. 5, 2010

(65) Prior Publication Data

US 2010/0194346 A1  Aug. 5, 2010

(30) Foreign Application Priority Data

Feb. 5, 2009  (KR) .................. 10-2009-0009452
Feb. 2, 2010  (KR) .................. 10-2010-0009430

(51) Int. Cl.
*H02J 7/00* (2006.01)
*H02J 7/04* (2006.01)
(52) U.S. Cl. ......... 320/134; 320/136; 320/150; 320/162
(58) Field of Classification Search ................. 320/134, 320/136
See application file for complete search history.

(56) References Cited

U.S. PATENT DOCUMENTS

| | | | | |
|---|---|---|---|---|
| 5,530,336 | A * | 6/1996 | Eguchi et al. ................. | 320/118 |
| 6,208,117 | B1 * | 3/2001 | Hibi ............... | 320/134 |
| 6,340,880 | B1 * | 1/2002 | Higashijima et al. ......... | 320/162 |
| 7,863,775 | B2 * | 1/2011 | Oh .................. | 307/66 |
| 2006/0051660 | A1 | 3/2006 | Chang et al. | |
| 2006/0164041 | A1 | 7/2006 | Ooshita et al. | |
| 2007/0188148 | A1 | 8/2007 | Kawasumi et al. | |
| 2008/0012532 | A1 * | 1/2008 | Denning ....................... | 320/134 |
| 2008/0018304 | A1 | 1/2008 | Litingtun et al. | |
| 2010/0196747 | A1 | 8/2010 | Takeda | |

FOREIGN PATENT DOCUMENTS

| | | |
|---|---|---|
| EP | 1 096 637 A1 | 5/2001 |
| GB | 2 226 716 A | 7/1990 |
| JP | 6-57050 U | 8/1994 |
| JP | 2003-142162 | 5/2003 |
| JP | 2006-210120 | 8/2006 |
| JP | 2006-352998 | 12/2006 |
| JP | 2007-215310 | 8/2007 |
| JP | 2009-005558 | 1/2009 |
| KR | 1020010036801 | 5/2001 |

(Continued)

OTHER PUBLICATIONS

English machine translation of Japanese publication No. 2006-210120, published Aug. 10, 2006 in the name of Oshita et al., 7 pgs.

(Continued)

*Primary Examiner* — M'Baye Diao
(74) *Attorney, Agent, or Firm* — Christie, Parker & Hale, LLP

(57) ABSTRACT

A protection circuit for a battery pack including a rechargeable battery cell having a positive electrode and a negative electrode is disclosed. The protection circuit includes a self-discharge switching device electrically connected to the positive electrode and the negative electrode of the battery cell, and a control unit electrically connected to the battery cell and the self-discharge switching device to turn-on or turn-off the self-discharge switching device according to a temperature of the battery cell.

14 Claims, 3 Drawing Sheets

FOREIGN PATENT DOCUMENTS

KR    1020060051075    5/2006

OTHER PUBLICATIONS

English machine translation of Japanese publication No. 2006-352998, published Dec. 28, 2006 in the name of Kaneko et al., 5pgs.
Japanese Office action dated Apr. 19, 2011, for corresponding Japanese Patent application 2010-023092, noting listed references in this IDS, as well as JP 2006-352998, previously submitted in an IDS dated Jan. 26, 2011.
Patent Abstracts of Japan, and English machine translation of Japanese Publication 2003-142162, listed above, 7 pages.
Japanese Office action dated May 15, 2012, for corresponding Japanese Patent application 2010-023092, (2 pages).
Extended European Search Report dated Feb. 17, 2012 for corresponding application 10152776.0, 6 sheets.

* cited by examiner

PROTECTION CIRCUIT FOR BATTERY PACK AND BATTERY PACK INCLUDING THE SAME

CROSS-REFERENCE TO RELATED APPLICATIONS

This application claims priority to and the benefit of Korean Patent Applications No. 10-2009-0009452 filed on Feb. 5, 2009 and No. 10-2010-0009430 filed on Feb. 2, 2010 in the Korean Intellectual Property Office (KIPO), the entire content of which is hereby incorporated by reference.

BACKGROUND

1. Field

Aspects of the present invention relate to a protection circuit for a battery pack and a battery pack including the same.

2. Description of the Related Art

A portable electronic equipment mounted inside a vehicle is exposed to internal heat of the vehicle and external heat introduced such as direct sunlight.

In particular, a portable electronic equipment, such as a navigator, is mounted inside a vehicle during use of the vehicle. In particular, in the summer season, the interior temperature of the vehicle can reach above 60° C., and the navigator is used in a high temperature environment.

In the navigator, there is a battery pack including a protection circuit and a rechargeable battery cell (for example, a lithium ion battery or a lithium polymer battery) for powering the navigator so that the navigator can be operated for several hours without using the power of the vehicle.

However, most users power the navigator mounted inside the vehicle by electrically connecting the navigator to the power source of the vehicle.

In this case, the battery pack mounted on the navigator is continuously being charged, so that the battery cell of the battery pack is charged to the full-charge voltage.

However, when the battery pack included in the navigator remains in the vehicle at a high temperature in the summer season, it becomes overheated by the interior temperature of the vehicle and by heat generated by the battery cell itself.

In this case, since the overcharging state of the battery cell is maintained in a high temperature, a swelling phenomenon is generated so that the battery cell becomes in a dangerous state.

SUMMARY

It is therefore an aspect of embodiments of the present invention to provide a protection circuit for a battery pack, which can stop a charge of a battery cell and the battery cell self-discharge compulsorily in a high temperature environment to inhibit swelling of the battery cell and to enhance a stability of the battery cell.

In accordance with an embodiment of the present invention, there is provided a protection circuit for a battery pack including a rechargeable battery cell having a positive electrode and a negative electrode, the protection circuit includes a self-discharge switching device electrically connected to the positive electrode and the negative electrode of the battery cell, and a control unit electrically connected to the battery cell and the self-discharge switching device to turn-on or turn-off the self-discharge switching device according to a temperature of the battery cell.

The protection circuit may further include a temperature sensor electrically connected to the battery cell and the control unit. The temperature sensor senses a temperature of the battery cell and the control unit turns-on the self-discharge switching device when the sensed temperature of the battery cell is above a reference temperature.

The reference temperature is between 45° C. and 70° C. and the temperature sensor includes a thermistor. In particular, the temperature sensor may further include a resistor for setting a sensing temperature.

The control unit senses a voltage of the battery cell and turns-on the self-discharge switching device when the voltage of the battery cell is above a reference voltage.

The protection circuit may further include a self-discharge resistor electrically connected between the battery cell and the self-discharge switching device. In addition, the protection circuit may further include a self-discharge indicating member electrically connected between the battery cell and the self-discharge switching device.

The protection circuit may further include a resistor electrically connected between the battery cell and the self-discharge indicating member for protecting the self-discharge indicating member. In addition, the protection circuit may further include a charge switching device electrically connected between the battery cell and the control unit.

In the protection circuit, the self-discharge switching device may be electrically connected to the charge switching device, the charge switching device may become turned-off when the self-discharge switching device is turned-on, and the charge switching device may become turned-on when the self-discharge switching device is turned-off.

In the protection circuit, the control unit may include a temperature sensing unit electrically connected to the temperature sensor for sensing a temperature of the battery cell, a voltage sensing unit electrically connected to the battery cell for sensing a voltage of the battery cell, and a driving circuit electrically connected to the charge switching device and the self-discharge switching device to turn-on or turn-off the charge switching device and the self-discharge switching device according to the temperature sensed by the temperature sensing unit and the voltage sensed by the voltage sensing unit.

BRIEF DESCRIPTION OF THE DRAWINGS

The features and aspects of the present invention will be more apparent from the following detailed description in conjunction with the accompanying drawing, in which.

DETAILED DESCRIPTION OF THE EMBODIMENTS

Figure 1:
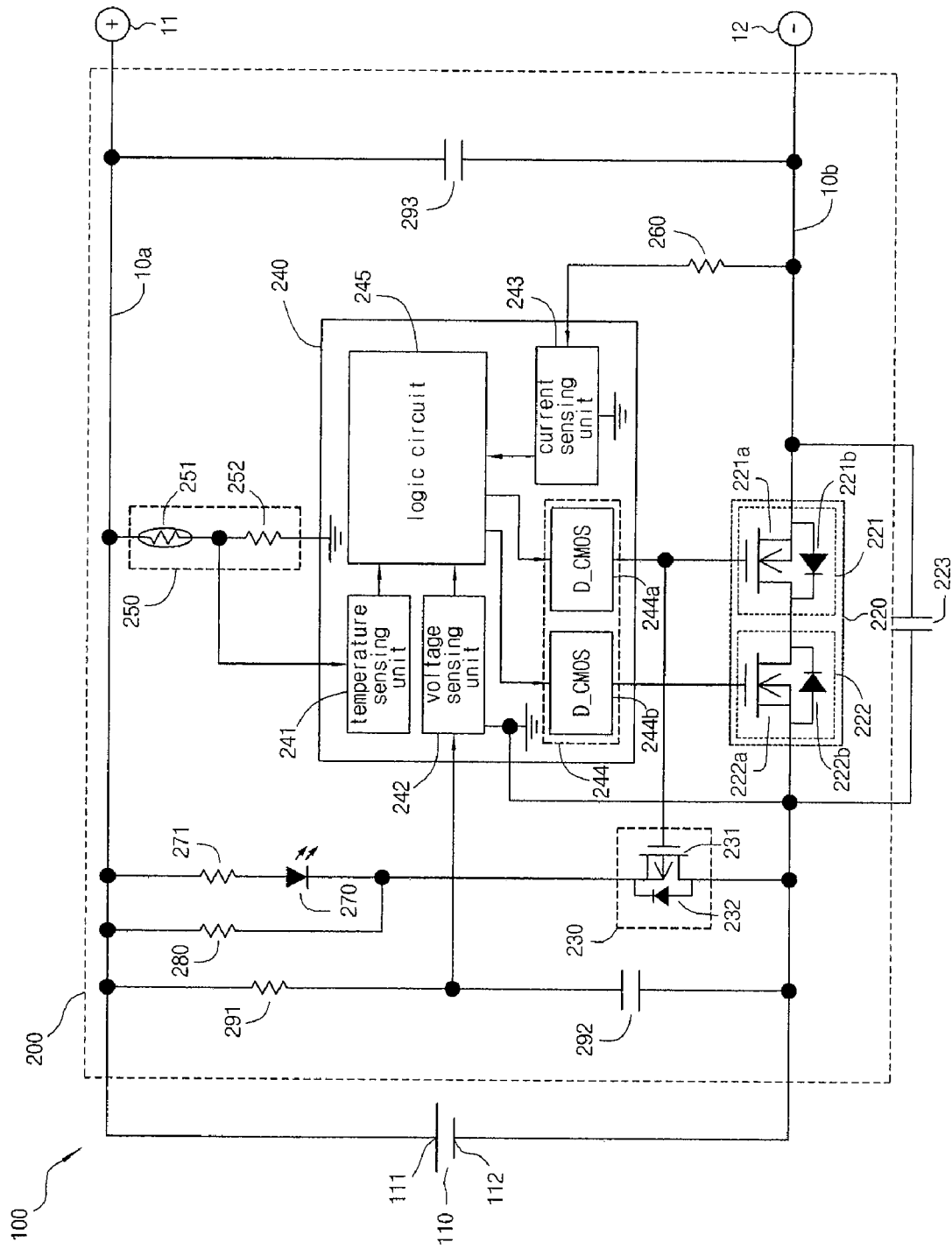
FIG. 1 is a schematic block diagram of a battery pack according to an embodiment of the present invention.

Hereinafter, embodiments of the present invention will be described in detail with reference to the accompanying drawings. In the embodiments of the present invention, the same or like reference numerals refer to the same or like elements. In addition, detailed descriptions of the same or like elements will be omitted.

FIG. 1 is a block diagram illustrating a structure of a battery pack according to an embodiment of the present invention.

As illustrated in FIG. 1, a battery pack 100 according to an embodiment of the present invention includes a battery cell 110, a protection circuit 200, a positive terminal 11 electrically connected to a positive electrode 111 of the battery cell 110 through a high-current path 10a, and a negative terminal 12 electrically connected to a negative electrode 112 of the battery cell 110 through a high-current path 10b.

The battery cell 110 is a rechargeable battery having the positive electrode 111 and the negative electrode 112. In one embodiment of the present invention, the battery cell 110 is a lithium ion battery or a lithium polymer battery, and may have a structure in which an electrode assembly and electrolyte are housed in a sealed case. Although one battery cell 110 is illustrated in FIG. 1 as one embodiment, it will be apparent that a plurality of battery cells may be electrically connected to each other in parallel or in series.

The protection circuit 200 includes a charge/discharge switching unit 220, a self-discharge switching device 230, a control unit 240, a temperature sensor 250, a current sensor 260, a self-discharge indicating member 270 and a self-discharge resistor 280. Further, the protection circuit 200 includes a capacitor 223 for stabilizing a switch, a resistor 271 for protecting the indicating member, a resistor 291 for sensing a voltage, a capacitor 292 for stabilizing a voltage and a capacitor 293 for stabilizing a charging/discharging voltage. In addition, the temperature sensor 250 includes a thermistor 251 and a resistor 252 for setting a sensing temperature.

The charge/discharge switching unit 220 includes a charge switching device 221 and a discharge switching device 222.

The charge switching device 221 includes a charging field effect transistor ("FET") 221a and a parasitic diode 221b for the charging FET. Here, although the parasitic diode 221b for the charging FET is inevitably formed in the manufacturing process of the charging FET 221a, the structural elements thereof will be separately described for the sake of convenience.

A drain and a source of the charging FET 221a are connected to the high-current path 10b of the battery cell 110. A gate of the charging FET 221a is electrically connected to the control unit 240, and the charging FET 221a is turned-on or turned-off by a control signal output from the control unit 240. For example, if the charging FET 221a receives a high-level signal transmitted from the control unit 240, the charging FET 221a is turned-on to allow a charging current to be flowed from a charger to the battery cell 110 or to allow a discharging current to be flowed from the battery cell 110 to an external load. In one embodiment of the present invention, an N-channel FET may be employed as the charging FET 221a to perform the above operation.

The parasitic diode 221b for the charging FET is electrically connected to the charging FET 221a in parallel. The parasitic diode 221b for the charging FET is arranged in the forward biased direction with respect to a flow direction (clockwise direction in FIG. 1) of the discharging current of the battery cell 110. Accordingly, even if the charging FET 221a is already turned-off by an overcharging protection function of the battery cell 110, it is possible to discharge the battery cell 110.

The discharge switching device 222 includes a discharging field effect transistor ("FET") 222a and a parasitic diode 222b for the discharging FET. Here, although the parasitic diode 222b for the discharging FET is inevitably formed in the manufacturing process of the discharging FET 222a, the structural elements thereof will be described separately for the sake of convenience.

A drain and a source of the discharging FET 222a are connected to the high-current path 10b of the battery cell 110.

A gate of the discharging FET 222a is electrically connected to the control unit 240, and the discharging FET 222a is turned-on or turned-off by a control signal output from the control unit 240. For example, if the discharging FET 222a receives a high-level signal transmitted from the control unit 240, the charging FET 222a is turned-on to allow a discharging current to be flowed from the battery cell 110 to an external load or to allow a charging current to be flowed from a charger to the battery cell 110. In one embodiment of the present invention, an N-channel FET may be employed as the discharging FET 222a to perform the above operation.

The parasitic diode 222b for the discharging FET is electrically connected to the discharging FET 222a in parallel. The parasitic diode 222b for the discharging FET is disposed in the forward biased direction with respect to a flow direction (counter-clockwise direction in FIG. 1) of the charging current of the battery cell 110. Accordingly, even if the discharging FET 222a is already turned-off by an over-discharging protection function of the battery cell 110, it is possible to discharge the battery cell 110.

Here, the capacitor 223 is connected to the charge/discharge switching unit 220 in parallel so that the capacitor 223 absorbs an impulse component of a current generated during a switching operation of the charge/discharge switching unit 220.

The self-discharge switching device 230 includes a self-discharging FET 231 and a parasitic diode 232 for the self-discharging FET 231.

A source of the self-discharging FET 231 is electrically connected to the positive electrode 111 of the battery cell 110, and a drain of the self-discharging FET 231 is electrically connected to the negative electrode 112 of the battery cell 110. In other words, the source of the self-discharging FET 231 is electrically connected to the high-current path 10a and the drain of the self-discharging FET 231 is electrically connected to the high-current path 10b. Further, a gate of the self-discharging FET 231 is electrically connected to the control unit 240 and the gate of the charging FET 221a. In one embodiment of the present invention, a P-channel FET may be utilized as the self-discharging FET 231. Therefore, in a case where the discharging FET 221a is turned-on, the self-discharging FET 231 becomes turned-off. In addition, in a case where the discharging FET 221a is turned-off, the self-discharging FET 231 becomes turned-on.

The parasitic diode 232 for the self-discharging FET 231 is electrically connected to the self-discharging FET 231 in parallel. In this case, the parasitic diode 232 for the self-discharging FET 231 is disposed in the reverse biased direction with respect of a direction of a self-discharging current flowed from the positive electrode 111 to the negative electrode 112 of the battery cell 110. As a result, in a state where self-discharging FET 231 is not turned-on by the control unit 240, the self-discharge indicating member 270, the resistor 271 for protecting the indicating member 270 and the self-discharge resistor 280 do not consume the power of the battery cell 110.

The control unit 240 includes a temperature sensing unit 241, a voltage sensing unit 242, a current sensing unit 243, a driving circuit 244 and a logic circuit 245

The temperature sensing unit 241 is electrically connected to the temperature sensor 250 to convert an analog temperature value of the battery cell 110 transmitted from the temperature sensor 250 into a digital temperature value that is transmitted to the logic circuit 245. Substantially, the temperature sensing unit 241 includes an analog/digital (A/D) converter. If a temperature of the battery cell 110 exceeds a reference temperature, the logic circuit 245 outputs a self-discharging signal to the driving circuit 244. That is, the logic circuit 245 outputs the self-discharging signal to a driving circuit 244a for charging. Then, the driving circuit 244a for charging outputs a low-level electrical signal to the charge switching device 221, and the charge switching device 221 becomes turned-off. At this time, since the low-level electrical signal is transmitted to the self-discharge switching device 230, the self-discharge switching device 230 becomes turned-on. Then, the battery cell 110 supplies a current through the self-discharging resistor 280 so that the self-discharge operation of the battery cell 110 is performed. Here, as described above, if the charge switching device 221 is turned-off, the self-discharge switching device 230 becomes turned-on, and if the charge switching device 221 is turned-on, the self-discharge switching device 230 becomes turned-off. These functions are caused by the N-channel type charge switching device 221 and the P-channel type self-discharge switching device 230.

The above-mentioned reference temperature may be set within a range of 45° C. to 70° C. In this case, when the temperature of the battery cell 110 is below the reference temperature, the logic circuit 245 controls the driving circuit 244a for charging such that a self-discharging signal is not outputted, so that the battery cell 110 is not self-discharged. In addition, when the temperature of the battery cell 110 exceeds the reference temperature, in order to secure a stability of the battery cell 110, the logic circuit 245 sends the self-discharging signal to the driving circuit 244a for charging to self-discharge the battery cell 110. The voltage sensing unit 242 is electrically connected to the positive electrode 111 and the negative electrode 112 of the battery cell 110 to sense the analog voltage value of the battery cell 110, and the voltage sensing unit 242 converts it into the digital value and provides the digital value to the logic circuit 245. In other words, the voltage sensing unit 242 is electrically connected between the resistor 291 for sensing a voltage and the capacitor 292 for stabilizing a voltage to obtain charging voltage or discharging voltage of the battery cell 110 in the form of an analog value. The voltage sensing unit 242 converts the obtained analog value of the above voltage into the digital value, and then provides the digital value to the logic circuit 245. Substantially, the voltage sensing unit 242 includes an analog/digital converter.

Here, the logic circuit 245 determines a self-discharge mode as well as an over-charge protection mode and an over-discharge protection mode according to a voltage of the battery cell 110. On the basis of each mode, the logic circuit 245 sends a control signal to the driving circuit 244 to turn-on or turn-off the charge/discharge switching device 220 and the self-discharge switching device 230.

Below, an over-discharge protection mode, an over-charge protection mode and a self-discharge protection mode are illustrated in more detail.

The over-discharge protection mode is performed when a voltage of the battery cell 110 is lowered below approximately 3.0 V. It will be apparent that the voltage sensing unit 242 senses a voltage of the battery cell 110. The over-discharge protection mode is a state in which the logic circuit 245 sends an over-discharge protection signal to the driving circuit 244b for discharging for turning-off the discharge switching device 222 to prevent the battery cell 110 to be over-discharged. However, in a case where the positive terminal 11 and the negative terminal 12 of the battery pack 100 are connected to a charger, since a charging current supplied from the charger is flowed through the battery cell 110, the parasitic diode 222b of the discharge switching device 222 and the charge switching device 221, it is possible to charge the battery cell 110.

The over-charge protection mode is carried out when the voltage of the battery cell 110 is above approximately 4.5 V. The over-charge protection mode is a state in which the logic circuit 245 sends an over-charge protection signal to the driving circuit 244a for charging for turning-off the charge switching device 221 to prevent the battery cell 110 to be over-charged. However, in a case where the positive terminal 11 and the negative terminal 12 of the battery pack 100 are connected to an external load, since a discharging current supplied from the battery cell 110 is flowed through the parasitic diode 221b of the charge switching device 221 and the discharge switching device 222, it is possible to discharge the battery cell 110.

At this time, since the charge switching device 221 is turned-off, the self-discharge switching device 230 becomes turned-on. Accordingly, the self-discharging current of the battery cell 110 is flowed through the resistor 271 for protecting the indicating member and the self-discharge indicating member 270. Furthermore, the self-discharging current of the battery cell 110 is flowed through the self-discharge resistor 280. Basically, the battery pack 100 according to an embodiment of the present invention performs the self-discharging operation when a temperature of the battery cell 110 exceeds the reference temperature. Due to the above, however, the battery pack 100 according to an embodiment of the present invention also performs the self-discharging operation in the over-charge protection mode. As a result, the battery cell 110 is discharged compulsorily when its temperature exceeds the reference temperature and its voltage is an over-charge voltage, and so the battery cell becomes more stable.

By the above operations, the self-discharge switching device 230 is turned-on to self-discharge the battery cell 110 when the charge switching device 221 is turned-off. On the contrary, if the self-discharge mode is stopped, the logic circuit 245 turns-on the charge switching device 221 and turns-off the self-discharge switching device 230. In other words, the safety of the battery pack 100 is improved by not performing concurrently the charge operation and the self-discharge operation in the battery pack 100. Moreover, the battery pack 100 is self-discharged when its temperature is raised above the reference temperature so that a swelling of the battery cell 110 is inhibited and a stability of the battery cell 110 is further improved.

In addition, the logic circuit 245 may send the self-discharge signal to the driving circuit 244a for charging to turn-on the self-discharge switching device 230 when the temperature of the battery cell 110 sensed by the temperature sensing unit 241 corresponds to the reference temperature set between 45° C. and 70° C. and the voltage of the battery cell 110 is above 3.9 V. In other words, the logic circuit 245 prohibits a self-discharge of the battery cell 110 to prevent waste of the power of the battery cell 110 when the voltage of the battery cell 110 is below 3.9 V. Here, since the logic circuit 245 only needs to operate in the self-discharge mode at a voltage of 3.9V and above to secure a stability of the battery cell 110, an upper limit of the voltage of the battery cell has no special meaning.

The logic circuit 245 stops a self-discharge of the battery cell 110 according to a temperature, a voltage and a discharge state of the battery cell 110.

The temperature sensing unit 241 senses that the temperature of the battery cell 110 is below the reference temperature, and sends the information thereon to the logic circuit 245. Then, the logic circuit 245 sends the self-discharge stopping signal to the driving circuit 244a for charging to turn-off the self discharge switching device 230. By the above described operations, the self-discharge of the battery cell 110 is stopped. Here, the charge switching device 221 is turned-on, and so the battery cell 110 is in a state in which a charging operation can be performed.

The voltage sensing unit 242 senses that the voltage of the battery cell 110 is below the reference voltage, and sends the information thereon to the logic circuit 245. Then, the logic circuit 245 sends the self-discharge stopping signal to the driving circuit 244a for charging to turn-off the self discharge switching device 230. The reference voltage may be set in the range of 3.0V to 3.9V. In other words, the logic circuit 245 may set the reference voltage between the over-discharge protection voltage and the over-charge protection voltage to stop the self-discharge. In one embodiment, as described above, a voltage of 3.9V is appropriate for the reference voltage.

By the above described operations, the self-discharge of the battery cell 110 is stopped. At this time, the charge switching device 221 is tuned-on, and so the battery cell 110 is in a state in which a charging operation may be performed.

The driving circuit 244 includes the driving circuit 244a for charging and the driving circuit 244b for discharging.

The driving circuit 244a for charging is electrically connected between the logic circuit 245 and the charge switching device 221. A power drive type switching circuit such as a CMOS FET may be utilized as the driving circuit 244a for charging, and the driving circuit 244a turns-on or turns-off the charge switching device 221 according to a control signal outputted from the logic circuit 245.

The driving circuit 244b for discharging is electrically connected between the logic circuit 245 and the discharge switching device 222. A power drive type switching circuit such as a CMOS FET may be employed as the driving circuit 244b for discharging, and the driving circuit 244b turns-on or turns-off the discharge switching device 222 according to a control signal outputted from the logic circuit 245.

The control unit 240 including the temperature sensing unit 241, the voltage sensing unit 242, the current sensing unit 243, the driving circuit 244 and the logic circuit 245, is electrically connected to the positive electrode 111 and the negative electrode 112 of the battery cell 110, and the control unit 240 is operated by the power supplied from the battery cell 110. In other words, the control unit 240 does not receive an external power, but performs by itself a charging operation, a discharging operation, a self-discharging operation and an over-current protecting operation according to a voltage of the battery cell 110 to secure the stability of the battery pack 100.

In one embodiment, the control unit 240 is implemented as an application specific integrated circuit (ASIC) which is a power drive type circuit device, and it may be utilized for directly driving the charge/discharge switching unit 220 according to the respective modes. Therefore, the control unit 240 turns-on or turns-off the charge/discharge switching unit 220 and the self-discharge switching device 230 at a very high response speed according to the respective modes to protect the battery cell 110.

Here, the resistor 291 for sensing a voltage is electrically connected between the control unit 240 and the positive electrode 111 of the battery cell 110. In this case, the capacitor 292 for stabilizing a voltage is provided between the resistor 291 for sensing a voltage and the negative electrode 112 of the battery cell 110 to protect the control unit 240 from external static electricity. The current sensor 260 is electrically connected between the control unit 240 and the negative electrode of the battery cell 110. In one embodiment, the current sensor 260 includes a resistor and divides a voltage applied to the resistor with a resistance value to calculate a current value. The current sensor 260 is electrically connected to the current sensing unit 243. Accordingly, the current sensing unit 243 utilizes the current sensor 160 to sense the current and transmits the information on the sensed current to the logic circuit 245. It will be apparent that the current sensing unit 243 may include an analog/digital converter to convert an analog value into a digital value and transmit the digital value to the logic circuit 245. Further, if the logic circuit determines that an over current (a charge current, a discharge current or a short current) flows through the high current paths 10a and 10b, the logic circuit 245 turns-off the charge/discharge switching unit 220 to protect the battery cell 110.

The temperature sensor 250 is electrically connected to the high-current path 10a of the battery cell 110 and the control unit 240. In one embodiment of the present invention, the temperature sensor 250 includes the thermistor 251 whose resistance value is varied according to temperature and the resistor 252 having a fixed resistance value for setting a sensing temperature. Accordingly, the temperature sensing unit 241 senses a temperature of the battery cell 110 on the basis of a voltage distribution principle of the thermistor 251 and the resistor 252 for setting a sensing temperature.

Here, the resistor 252 for setting a sensing temperature is electrically connected between the thermistor 251 and a ground terminal. Under the same temperature, since a dividing voltage caused by the thermistor 251 and the resistor 252 for setting a sensing temperature is varied according to a resistance value of the resistor 252 for setting a sensing temperature, it is possible to adjust a sensing temperature range of the temperature sensing unit 241.

For example, when the thermistor 251 is defined as "R3" and the resistor 252 for setting a sensing temperature is defined as "R4", a dividing voltage "Vth" caused by R3 and R4 is generally obtained by the following Equation 1. Here, the dividing voltage "Vth" is a voltage detected by the temperature sensing unit 241 and "VDD" is a voltage of the battery cell 110.

$$V_{th} = VDD*R4/(R3+R4) \qquad \text{Equation 1}$$

In addition, the resistance value R3 of the thermistor 251 is obtained by the following Equation 2.

$$R3 = R0 \exp B(1/T - 1/T0) \qquad \text{Equation 2}$$

Wherein, R3: resistance value in an ambient temperature of T(K);
R0: resistance value at an ambient temperature of T0(K);
B: constant of the thermistor.

Accordingly, from the above Equations 1 and 2, the Equation 3 corresponding to a temperature T to be sensed can be obtained.

$$T = 1/(1/T0 + (\ln(R3/R0)/B) \qquad \text{Equation 3}$$

Wherein, "R3" is experimentally 3R4/17.

By the above Equations, a temperature "T" to be sensed can be determined by selecting appropriately the thermistor 251 and the resistor 252 for setting a sensing temperature.

The self-discharge indicating member 270 is electrically connected between the self-discharge switching device 230 and the high-current path 10a of the battery cell 110. In a case where the self-discharge switching device 230 is turned-on by a control signal of the control unit 240, the self-discharge indicating member 270 indicates visually that the self-discharge switching device 230 is being operated. For example, a light emitting diode may be utilized as the self-discharge indicating member 270. Of course, the self-discharge indicating member 270 consumes a current from the battery cell 110 so that the battery cell 110 is self-discharged more rapidly by the self-discharge indicating member 270.

The resistor 271 for protecting the indicating member is electrically connected between the self-discharge indicating member 270 and the high-current path 10a of the battery cell 110. The resistor 271 for protecting the indicating member allows a suitable voltage (e.g., a predetermined voltage) to be applied to the self-discharge indicating member 270 to prevent the self-discharge indicating member 270 from being damaged. Of course, since the resistor 271 for protecting the indicating member consumes a current from the battery cell 110, the battery cell 110 is self-discharged more rapidly by the resistor 271 for protecting the indicating member.

The resistor 280 for self-discharge is electrically connected between the self-discharge switching device 230 and the high-current path 10a of the battery cell 110. Here, the resistor 280 for self-discharge is connected to the resistor 271 for protecting the indicating member in parallel. The resistor 280 for self-discharge makes the battery cell 110 to be discharged more rapidly to further enhance the stability of the battery pack 100. Here, the resistor 280 for self-discharge as well as the self-discharge indicating member 270 and the resistor 271 for protecting the indicating member cause a self-discharge of the battery cell 110. Accordingly, in some embodiments, the resistor 280 for self-discharging the battery cell 110, the self-discharge indicating member 270, and the resistor 271 for protecting the indicating member for self-discharging the battery cell 110 are not included.

The capacitor 293 for stabilizing a charging/discharging voltage is electrically connected to the positive electrode 11 and the negative electrode 12. The capacitor 293 for stabilizing a charging/discharging voltage absorbs an impulse component of the current generated when an external load such as a charger or a portable electronic equipment is connected to the positive electrode 11 and the negative electrode 12, so that the capacitor 293 for stabilizing a charging/discharging voltage protects the control unit 240.

Below, an operation of the control unit 240 constituting the battery pack 100 as described above is illustrated. In particular, an operation of the logic circuit 245 of the control unit 240 is illustrated.

Figure 2:
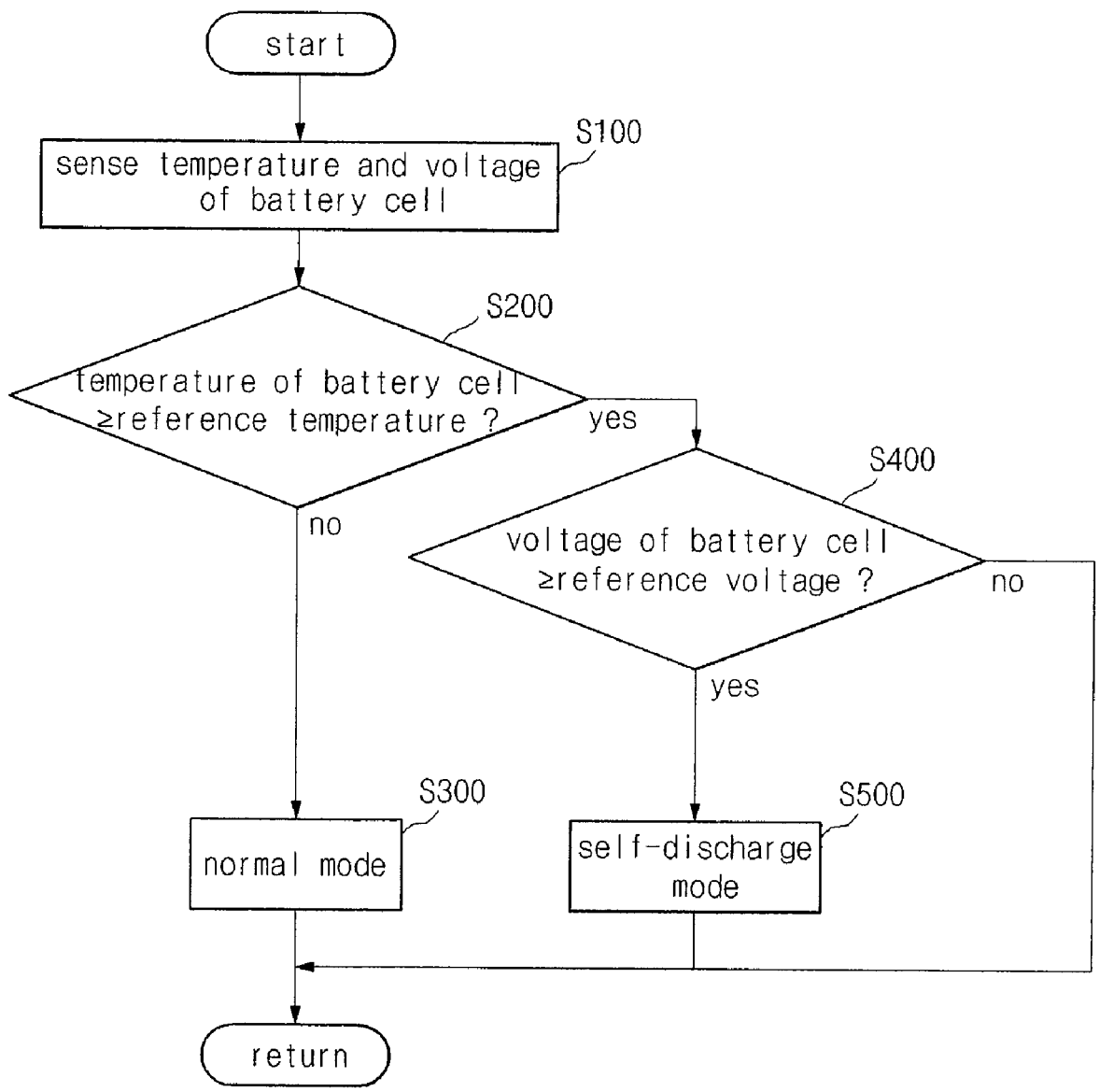
FIG. 2 is flow chart for illustrating an operation sequence of a battery pack according to an embodiment of the present invention.

FIG. 2 is flow chart for illustrating an operation sequence of the battery pack 100 according to an embodiment of the present invention.

As shown in FIG. 2, an operation of the protection circuit 240 for the battery pack 100 according to one embodiment of the present invention includes a step S100 of sensing a temperature and a voltage of the battery cell, a step S200 of determining whether or not a temperature of the battery cell is above the reference temperature, a step S400 of determining whether or not a voltage of the battery cell is above the reference voltage, and a step S500 of entering a self-discharge mode.

Here, in the step S200, if the logic circuit determines that a temperature of the battery cell is below the reference temperature, a normal mode step S300 is entered. The normal mode refers to the over-charge protection mode, the over-discharge protection mode, or the over-current protection mode.

Here, without additional description, it should be understood that the above steps are performed by the control unit of the battery pack, which includes the logic circuit.

In the step S100 of sensing the temperature and voltage of the battery cell, the control unit senses a temperature of the battery cell by utilizing the temperature sensing unit and senses a voltage of the battery cell by utilizing the voltage sensing unit.

In the step S200 of determining whether or not the temperature of the battery cell is above the reference temperature, the control unit determines whether or not the temperature of the battery cell sensed as described above exceeds the reference temperature. Here, although approximately 40° C. to 70° C. may be set as the reference temperature, the present invention is not limited thereto. In other words, the reference temperature may be changed according to the kind, shape, structure and capacity of the battery cell. However, in one embodiment, the reference temperature is set at approximately 45° C. since the swelling phenomenon begins at a temperature of approximately 45° C. in the lithium ion battery or a lithium polymer battery.

If the temperature of the battery cell is determined to be above the reference temperature in the step S200, the step S400 is carried out.

In the step S400 of determining whether or not the voltage of the battery cell is above the reference voltage, the control unit determines whether or not the voltage of the battery cell sensed as described above is above the reference voltage. Here, although approximately 3.0V to 3.9V may be set as the reference voltage, the embodiments of the present invention are not limited thereto. In other words, the reference voltage may be changed according to the kind, shape, structure and capacity of the battery cell. In one embodiment, the reference voltage is set to approximately 3.9V since a swelling phenomenon begins at a temperature of approximately 45° C. or more and at a voltage of approximately 3.9V in the lithium ion battery or a lithium polymer battery.

If the voltage of the battery cell is determined to be above the reference voltage in the step S400, the step S500 is executed.

In the self-discharge mode step S500, the control unit self-discharges the battery cell until the voltage of the battery cell reaches a certain level. In other words, the control unit turns-on the self-discharge switching device to discharge the battery cell until the voltage of the battery cell reaches approximately 3.8V. However, the present invention is not limited to the above the voltage level. That is, the voltage level at which the self-discharge of the battery cell is stopped may be varied according to the kind, shape, structure and capacity of the battery cell.

As shown in FIG. 2, here, although an operation may be performed in an order of the step S200 and the step S400, the present invention is not limited thereto. In other words, an operation of an embodiment of the present invention may be performed in an order of the step S400 and the step S200. It will be apparent that the self-discharge mode step S500 is performed if all the above two steps (conditions) are finally satisfied.

For example, in a case where the temperature of the battery cell is above 45° C. and the voltage of the battery cell is above 3.9 V, the self-discharge mode step S500 is performed.

Figure 3:
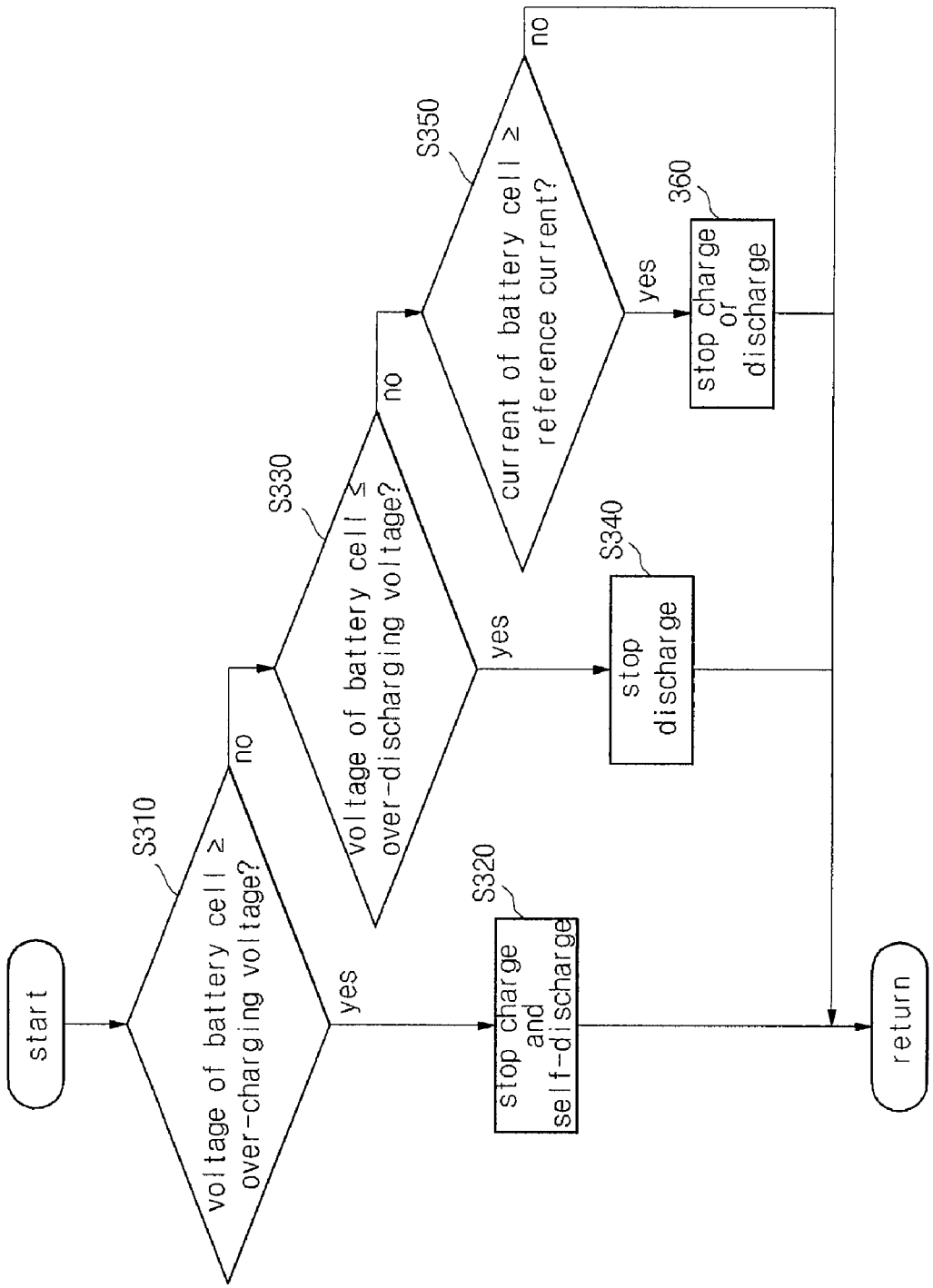
FIG. 3 is flow chart for illustrating another operation sequence of a battery pack according to an embodiment of the present invention.

FIG. 3 is flow chart for illustrating another operation sequence of a battery pack according to an embodiment of the present invention.

The normal mode is performed if the temperature of the battery cell is below the reference temperature. In other words, in a case where the result in the step S200 (see FIG. 2) is "No", the normal mode is performed.

The normal mode includes the step S310 of determining whether or not the voltage of the battery cell is above the over-charging voltage; the step S320 of stopping a charge and of performing a self-discharge in a case where the result of the step S310 is "Yes"; the step S330 of determining whether or not the voltage of the battery cell is below the over-discharging voltage in a case where the result of the step S310 is "No"; the step S340 of stopping a discharge in a case where the result of the step S330 is "Yes"; the step S350 of determining whether or not the current of the battery cell is above the reference current; and the step S360 of stopping a charge or a discharge in a case where the result of the step S350 is "Yes."

In the step S310 of determining whether or not the voltage of the battery cell is above the over-charging voltage, the control unit determines whether or not the voltage of the battery cell is above the over-charging voltage (for example, 4.5 V) by utilizing the voltage sensing unit.

In the step S320 of stopping a charge and performing a self-discharge, the control unit sends a charge stopping signal to the charge switching device to turn-off the charge switching device. Accordingly, a charge of the battery cell is stopped. In this state, however, a discharge of the battery cell may be performed by the parasitic diode of the charge switching device. Here, the self-discharge switching device is turned-on, and so the battery cell is self-discharged. In embodiments of the present invention, in other words, the self-discharge switching device is automatically turned-on when the charge switching device is turned-off, and so the above operation can be obtained. As a result, the over-charging state of the battery cell is rapidly averted.

In the step S330 of determining whether or not the voltage of the battery cell is below the over-discharging voltage, the control unit determines whether or not the voltage of the battery cell is below the over-discharging voltage (for example, 3.0 volts) by utilizing the voltage sensing unit.

In the step S340 of stopping a discharge, the control unit sends a discharge stopping signal to the discharge switching device to turn-off the discharge switching device. Accordingly, a discharge of the battery cell is stopped. In this state, however, a charge of the battery cell may be performed by the parasitic diode of the discharge switching device.

In the step S350 of determining whether or not the current of the battery cell is above the reference current, the control unit determines whether or not the current (a charging current or a discharging current) of the battery cell is above the reference current by utilizing of the current sensing unit.

In the step S360 of stopping a charge or a discharge, the control unit sends a charge stopping signal or a discharge stopping signal to the charge switching device or the discharge switching device to turn-off the charge switching device or the discharge switching device.

In addition, the steps 310, 330 and 350 can be performed in an order which differs from that as described above. The method of other embodiments of the present invention may be performed in the orders of the step 330, the step 350 and the step S310, or the step 350, the step 310 and the step S320, or the step 330, the step 310 and the step S350, or the step 350, the step 330 and the step S310, or the step 310, the step 330 and the step S350. However, embodiments of the present invention are not limited to the above orders.

Although the embodiments of the present invention have been described in detail hereinabove, it should be understood that many variations and modifications of the basic inventive concept herein described will still fall within the spirit and scope of the present invention as defined in the appended claims and their equivalents.

What is claimed is:

1. A protection circuit for a battery pack including a rechargeable battery cell having a positive electrode and a negative electrode, comprising:

a self-discharge switching device electrically connected to the positive electrode and the negative electrode of the battery cell;

a control unit electrically connected to the battery cell and the self-discharge switching device to turn-on or turn-off the self-discharge switching device according to a temperature of the battery cell; and a self-discharge indicating member electrically connected between the battery cell and the self-discharge switching device.

2. The protection circuit of claim 1, further comprising a temperature sensor electrically connected to the battery cell and the control unit, wherein the temperature sensor senses a temperature of the battery cell and the control unit turns-on the self-discharge switching device when the sensed temperature of the battery cell is above a reference temperature.

3. The protection circuit of claim 2, wherein the reference temperature is between 45° C. and 70° C.

4. The protection circuit of claim 2, wherein the temperature sensor comprises a thermistor.

5. The protection circuit of claim 2, wherein the temperature sensor comprises a resistor for setting a sensing temperature.

6. The protection circuit of claim 1, wherein the control unit senses a voltage of the battery cell and turns-on the self-discharge switching device when the voltage of the battery cell is above a reference voltage.

7. The protection circuit of claim 6, wherein the reference voltage is between 3.0V and 3.9V.

8. The protection circuit of claim 1, further comprising a self-discharge resistor electrically connected between the battery cell and the self-discharge switching device.

9. The protection circuit of claim 1, wherein the self-discharge indicating member comprises a light-emitting diode.

10. The protection circuit of claim 1, further comprising a resistor electrically connected between the battery cell and the self-discharge indicating member for protecting the self-discharge indicating member.

11. The protection circuit of claim 1, further comprising a charge switching device electrically connected between the battery cell and the control unit.

12. The protection circuit of claim 11, wherein the self-discharge switching device is electrically connected to the charge switching device, the charge switching device becomes turned-off when the self-discharge switching device is turned-on, and the charge switching device becomes turned-on when the self-discharge switching device is turned-off.

13. The protection circuit of claim 11, wherein the control unit comprises:

a temperature sensing unit electrically connected to a temperature sensor for sensing a temperature of the battery cell;

a voltage sensing unit electrically connected to the battery cell for sensing a voltage of the battery cell; and a driving circuit electrically connected to the charge switching device and the self-discharge switching device to turn-on or turn-off the charge switching device and the self-discharge switching device according to the temperature sensed by the temperature sensing unit and the voltage sensed by the voltage sensing unit.

14. A battery pack comprising a protection circuit and a rechargeable battery cell having a positive electrode and a negative electrode, the protection circuit comprising:

a self-discharge switching device electrically connected to the positive electrode and the negative electrode of the battery cell;

a control unit electrically connected to the battery cell and the self-discharge switching device, the control unit being configured to turn-on or turn-off the self-discharge switching device according to a temperature of the battery cell; and a self-discharge indicating member electrically connected between the battery cell and the self-discharge switching device.

* * * * *